United States Patent [19]

Springer et al.

[11] Patent Number: 5,003,053
[45] Date of Patent: Mar. 26, 1991

[54] WATER-SOLUBLE MONOAZO COMPOUNDS CONTAINING A P-AMINOPHENYLAMINO- AND CHLORO- OR FLUORO-SUBSTITUTED TRIAZINYLAMINO GROUP AND A FIBER-REACTIVE GROUP SELECTED FROM THE VINYLSULFONE SERIES, SUITABLE AS DYESTUFFS

[75] Inventors: Hartmut Springer, Königstein/Taunus; Walter Helmling, Hofheim am Taunus; Ludwig Schläfer, Kelkheim; Werner H. Russ, Hofheim am Taunus, all of Fed. Rep. of Germany

[73] Assignee: Hoechst Aktiengesellschaft, Frankfurt am Main, Fed. Rep. of Germany

[21] Appl. No.: 497,734

[22] Filed: Mar. 19, 1990

Related U.S. Application Data

[63] Continuation of Ser. No. 361,226, Jun. 5, 1989, abandoned.

[51] Int. Cl.$^5$ ............... C09B 62/085; C09B 62/51; C09B 67/24; D06P 1/38
[52] U.S. Cl. ...................... 534/638; 534/582; 534/583; 534/593; 534/598; 534/617; 534/632; 534/633; 534/634; 534/635; 534/636; 534/637; 534/642; 534/887
[58] Field of Search ............... 534/632–638, 534/617, 642

[56] References Cited

U.S. PATENT DOCUMENTS

| | | | |
|---|---|---|---|
| 4,378,313 | 3/1983 | Kayane et al. | 534/638 |
| 4,725,674 | 2/1988 | Segal et al. | 534/630 |
| 4,731,441 | 3/1988 | Segal et al. | 534/637 |
| 4,740,592 | 4/1988 | Springer et al. | 534/642 |
| 4,757,136 | 7/1988 | Springer et al. | 534/642 |

FOREIGN PATENT DOCUMENTS

| | | | |
|---|---|---|---|
| 0064721 | 11/1982 | European Pat. Off. | 534/638 |
| 0065211 | 11/1982 | European Pat. Off. | 534/638 |
| 0094055 | 11/1983 | European Pat. Off. | 534/638 |
| 3217812 | 11/1983 | Fed. Rep. of Germany | 534/642 |
| 3624136 | 4/1987 | Fed. Rep. of Germany | 534/642 |
| 58-46185 | 3/1983 | Japan | 534/638 |

OTHER PUBLICATIONS 58-46186, Mar. 1983, Japan, Sumitomo II.

*Primary Examiner*—Floyd D. Higel

[57] ABSTRACT

Water-soluble monoazo compounds of the general formula (1) which dye in fast, mainly red shades materials which contain carboxamide and/or hydroxy groups, preferably in the form of fibers, in particular cellulose fiber materials.

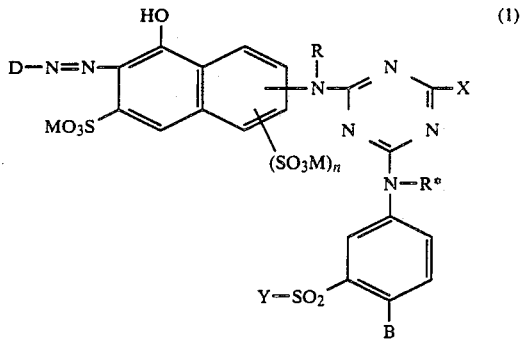

in which:
Y is $\beta$-thiosulfatoethyl, $\beta$-phosphatoethyl, $\beta$-chloroethyl, vinyl or $\beta$-sulfatoethyl,
M is hydrogen, an alkali metal or an alkaline-earth metal,
D is naphthyl which is substituted by sulfo and/or a group of the formula $Y-SO_2-$, or is one of the radicals

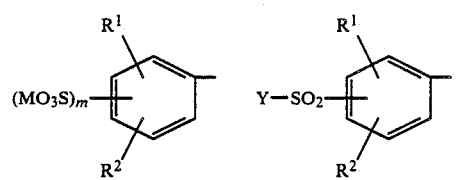

in which M and Y have one of the above meanings, m is the number zero or 1, $R^1$ is hydrogen, lower alkyl, lower alkoxy or carboxy, and $R^2$ is hydrogen, lower alkyl, lower alkoxy, sulfo, carboxy, optionally substituted aryl, hydroxy, nitro or halogen,
n is the number zero or 1,
R is hydrogen or optionally substituted lower alkyl,
R* is hydrogen or optionally substituted lower alkyl,
X is fluorine or chlorine,
B is a group of the formula

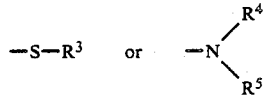

in which $R^3$ is hydrogen or optionally substituted lower alkyl or aryl, $R^4$ is hydrogen, optionally substituted alkyl having 1 to 8 carbon atoms or cycloalkyl having 5 to 8 carbon atoms and optionally having 1 to 3 methyl groups and/or one amino, lower alkanoylamino or benzoylamino group as substituents, or is the phenyl radical which may be substituted by sulfo, carboxy, halogen, lower alkyl, lower alkoxy, nitro, a group of the formula $-SO_2-Y'$ (where Y' has one of the meanings of Y or is $\beta$-hydroxyethyl), lower alkylamino, lower dialkylamino, lower alkanoylamino and/or benzoylamino, or is naphthyl radical, which may be substituted by sulfo and/or a group of the formula $-SO_2-Y'$, and $R^5$ has one of the meanings specified for $R^4$, or $R^4$ and $R^5$, together with the nitrogen atom and one, two or three lower alkylene radicals and, if appropriate, one or two further heteroatoms, form a lower heterocyclic radical.

11 Claims, No Drawings

WATER-SOLUBLE MONOAZO COMPOUNDS CONTAINING A P-AMINOPHENYLAMINO- AND CHLORO- OR FLUORO-SUBSTITUTED TRIAZINYLAMINO GROUP AND A FIBER-REACTIVE GROUP SELECTED FROM THE VINYLSULFONE SERIES, SUITABLE AS DYESTUFFS

This is a continuation of Ser. No. 361,226, filed June 5, 1989, now abandoned, which is a continuation of Ser. No. 154,860, filed Feb. 10, 1988, now abandoned.

DESCRIPTION

The invention is in the area of fiber-reactive azo dyes.

Fiber-reactive dyes are employed extensively for dyeing and printing textile fiber materials, and a large number of useful reactive dyes are available for various areas of application. Thus, azo dyes which contain a fiber-reactive radical from the vinyl sulfone series and a further fiber-reactive radical from the monochlorotriazinyl or monofluorotriazinyl series are described, for example, in European Patent Application Publication No. 0,094,055 and in Japanese Application Publications Nos. Sho-58-46,185, Sho-58-46,186 and Sho-59-179,888. However, the technical state which has been achieved is not entirely satisfactory. The known dyes have certain applicational problems, such as, for example, inadequate suitability for certain dyeing methods, and in some cases not entirely satisfactory fastnesses, such as, for example, inadequate wet light fastness and perspiration light fastness.

The present invention had the object of finding novel water-soluble reactive dyes having improved properties, where these novel dyes should be particularly suitable for the exhaust method and should give dyeings having a high fastness level. This object has been achieved by the present invention.

The invention relates to novel, valuable, water-soluble azo compounds of the general formula (1)

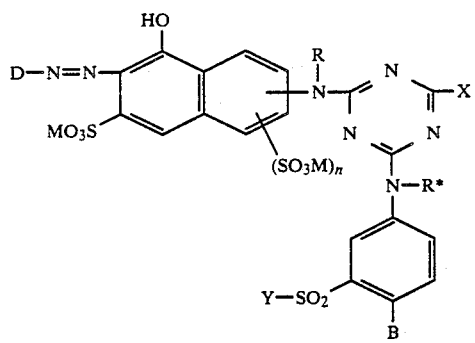

in which:

D is a naphthyl radical, preferably the naphth-2-yl radical, which is substituted by 1, 2 or 3 sulfo groups or by one group of the general formula Y—SO₂— where Y has the belowmentioned meaning, or by one such Y—SO₂— group and 1 or 2 sulfo groups, or is a radical of the general formula (2a) or (2b)

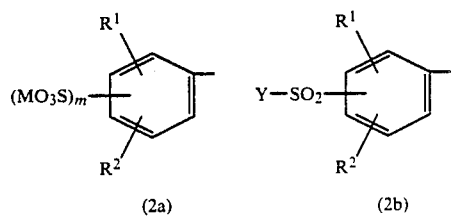

in which
M and Y have the belowmentioned meanings,
m represents the number zero or 1 (where this group denotes a hydrogen atom in the case where m=zero),
$R^1$ denotes a hydrogen atom, an alkyl group having 1 to 4 carbon atoms, an alkoxy group having 1 to 4 carbon atoms or a carboxy group, and
$R^2$ denotes a hydrogen atom, an alkyl group having 1 to 4 carbon atoms, an alkoxy group having 1 to 4 carbon atoms, a sulfo group, a carboxy group, an aryl radical which may be substituted, a hydroxy group, a nitro group or a halogen atom, such as a chlorine or bromine atom, of these preferably a hydrogen atom, an alkyl group having 1 to 4 carbon atoms, an alkoxy group having 1 to 4 carbon atoms, a sulfo group or a halogen atom;
n represents the number zero or 1 (where this group denotes a hydrogen atom in the case where n=zero);
R is either a hydrogen atom or an optionally substituted alkyl group having 1 to 4 carbon atoms, and
R* is either a hydrogen atom or an optionally substituted alkyl group having 1 to 4 carbon atoms,
where R and R* may have meanings which are identical to one another or different from one another;
X is a fluorine atom or, preferably a chlorine atom;
B is a group of the general formula (3a) or (3b)

in which
$R^3$ is a hydrogen atom, an optionally substituted alkyl group having 1 to 4 carbon atoms, or an optionally substituted aryl radical,
$R^4$ is a hydrogen atom, an optionally substituted alkyl group having 1 to 8 carbon atoms, preferably having 1 to 6 carbon atoms, in particular having 1 to 4 carbon atoms, 1 or 2 of these substituents preferably being water-solubilizing groups, such as sulfo, carboxy sulfato and phosphato groups, or is a cycloalkyl group having 5 to 8 carbon atoms, such as the cyclopentyl or cyclohexyl group, and optionally having 1 to 3 methyl groups and/or one amino group, alkanoylamino group having 2 to 5 carbon atoms or benzoylamino group as substituents, or is the phenyl radical which may be substituted by 1, 2 or 3, preferably 1 or 2, substituents from the series comprising sulfo, carboxy halogen, such as bromine and, in particular, chlorine, alkyl having 1 to 4 carbon atoms, such as methyl and ethyl, alkoxy having 1 to 4 carbon atoms, such as methoxy and ethoxy, nitro, a group of the formula -SO$_2$-Y' (in which Y' has one of the belowmentioned meanings for Y or is a β-hydroxyethyl group), alkylamino containing an alkyl radical having 1 to 4 carbon atoms, dialkylamino containing alkyl radicals each having 1 to 4 carbon atoms, alkanoylamino having 2 to 5 carbon atoms, such as acetylamino, and benzoylamino, or is a naphthyl radical which may be substituted by 1, 2 or 3 sulfo groups and/or a group of the formula -SO$_2$-Y' (where Y' has the abovementioned meaning), and $R^5$ has one of the meanings mentioned for $R^4$, $R^5$ being identical to $R^4$ or different from $R^4$, or $R^4$ and $R^5$, together with the nitrogen atom and one, two or three alkylene radicals having 1 to 5 carbon atoms and, if appropriate, one or two further heteroatoms, such as nitrogen, oxygen or sulfur atoms, form a 5- to 8-membered heterocyclic radical, such as, for example, the piperidino, piperazino-or morpholino radical;

Y is a β-thiosulfatoethyl, β-phosphatoethyl or β-chloroethyl group or, preferably, the vinyl group or, particularly preferably, a β-sulfatoethyl group: where the Ys may have meanings which are identical to one another or different from one another;

M is a hydrogen atom or an alkali metal, such as sodium, potassium or lithium, or the equivalent of an alkaline earth metal, such as of calcium, but preferably a hydrogen atom and, in particular, an alkali metal.

The various groups in the formulae may have meanings which are identical to one another or different from one another.

A sulfo group is a group of the general formula -SO$_3$M, a carboxy group is a group of the general formula -COOM, a thiosulfato group is a group of the general formula -S-SO$_3$M, a phosphato group is a group of the general formula -OPO$_3$M$_2$, and a sulfato group is a group of the general formula -OSO$_3$M, where M in each case has the abovementioned meaning.

The novel azo compounds can exist in acidic form and in the form of their salts. They are preferably in the form of the salts, in particular the alkali metal salts, and are also preferably used in the form of these salts for dyeing (here and below understood in the general sense and including printing) of materials containing hydroxy groups and/or carboxamide groups, in particular fiber materials.

Alkyl groups having 1 to 4 carbon atoms are preferably the methyl and ethyl groups; alkoxy groups having 1 to 4 carbon atoms are preferably the methoxy and ethoxy groups.

If the alkyl groups are substituted, they are preferably substituted by 1 or 2, preferably 1, substituents which are selected from the series comprising alkoxy having 1 to 4 carbon atoms, sulfo, carboxy) hydroxy, alkanoyloxy having 2 to 5 carbon atoms, such as acetyloxy, sulfato and optionally substituted aryl.

Aryl radicals are preferably the phenyl radical or the 1- or 2-naphthyl radical, in particular the phenyl radical. If the phenyl radical is substituted, it is preferably substituted by 1 or 2 substituents which are selected from the series comprising alkyl having 1 to 4 carbon atoms, alkoxy having 1 to 4 carbon atoms, hydroxy, nitro, carboxy, acetylamino, sulfo and chlorine, in particular sulfo and carboxy; if the naphthyl radical is substituted, it is preferably substituted by one, two or three sulfo groups. If the $R^4$ and $R^5$ radicals in the formulae denote substituted aryl radicals, one or two, preferably one, of the substituents may alternatively be the abovementioned and defined -SO$_2$Y' group as defined above.

Substituted phenyl radicals of the D radical in the formulae are, in particular, those which are substituted by 1, 2 or 3 substituents which are selected from the series comprising 2 sulfo, 1 alkyl having 1 to 4 carbon atoms, 2 alkoxy having 1 to 4 carbon atoms, and 1 chlorine, such as, for example, the 2-sulfophenyl, 3-sulfophenyl, 4-sulphophenyl, 2-sulfo-4-methylphenyl, 2-sulfo-4-methoxyphenyl, 3-sulfo-4-methoxyphenyl, 2-sulfo-4-chloro-5-methylphenyl, 2,5-disulfophenyl and 2,5-disulfo-4-methylphenyl radicals.

Substituted naphthyl radicals of the D radical in the formulae are preferably monosulfo-, disulfo- and trisulfonaphth-2-yl radicals, such as, for example, the 1-sulfonaphth-2-yl, 5-sulfonaphth-2-yl, 6-sulfonaphth-2-yl, 1,5-disulfonapth-2-yl, 1,6-disulfonapth-2-yl, 3,6-disulfonaphth-2-yl, 4,8-disulfonaphth-2-yl, 6,8-disulfonaphth-2-yl, 3,6,8-trisulfonaphth-2-yl and 4,6,8-trisulfonaphth-2-yl radicals.

In addition, in D, if D is a group of the formula (2a), $R^1$ is preferably a hydrogen atom, or a methyl, ethyl, methoxy or ethoxy group, and $R^2$ is preferably a hydrogen atom, a methoxy, ethoxy, or sulfo group, or a chlorine atom.

If D is a group of the formula (2b), $R^1$ is preferably a hydrogen atom or a methyl, ethyl, methoxy or ethoxy group, in particular a hydrogen atom or a methyl or methoxy group, and $R^2$ is a hydrogen atom or a methoxy, ethoxy or sulfo group.

R preferably denotes a methyl or ethyl group or a hydrogen atom, and R* is preferably a hydrogen atom.

The radical B is preferably an amino group of the general formula (3b). In this formula, $R^4$ is preferably a hydrogen atom, an alkyl group having 1 to 4 carbon atoms, an alkyl group having 1 to 4 carbon atoms which is substituted by 1 or 2 substituents, preferably by 1 substituent, from the series comprising sulfo, carboxy, sulfato, phosphato, alkoxy having 1 to 4 carbon atoms, hydroxy, alkanoyloxy having 2 to 5 carbon atoms and phenyl which is optionally substituted by sulfo, carboxy, methyl, methoxy, ethoxy and/or chlorine, or is a cyclopentyl or cyclohexyl group which may be substituted by 1 to 3 methyl groups, and $R^5$, where $R^4$ is identical to $R^4$ or different from $R^4$, is a hydrogen atom, an alkyl group having 1 to 4 carbon atoms, an alkyl group having 1 to 4 carbon atoms which is substituted by 1 or 2 substituents, preferably 1 substituent, from the series comprising sulfo, carboxy, sulfato, phosphato, alkoxy having 1 to 4 carbon atoms, hydroxy, alkanoyloxy having 2 to 5 carbon atoms and phenyl which is optionally substituted by sulfo, carboxy, methyl, methoxy, ethoxy and/or chlorine, or is the phenyl radical, which may be substituted by 1, 2 or 3, preferably 1 or 2, substituents from the series comprising sulfo, carboxy, chlorine, methyl, methoxy, ethoxy, nitro and acetylamino, or is a naphthyl radical which is optionally substituted by 1, 2 or 3 sulfo groups, or $R^4$ and $R^5$ together form the piperidino, piperazino or morpholino radical. In this formula, $R^4$ is particularly preferably a hydrogen atom, a methyl group or an ethyl group and $R^5$ is particularly preferably a hydrogen atom, an alkyl group having 1 to 4 carbon atoms, or an alkyl group having 2 to 4 carbon atoms which is substituted by one or two sulfato groups or one sulfo group or one carboxy group, or is a phenyl group which is substituted in accordance with the particularly preferred definitions above; $R^5$ is particularly preferably a β-sulfoethyl, β-sulfatoethyl, methyl or ethyl group.

Preferred azo compounds of the compounds of the general formula (1) are those which correspond to a general formula (1a) or (1b)

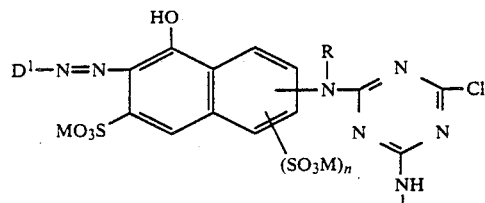
(1a)

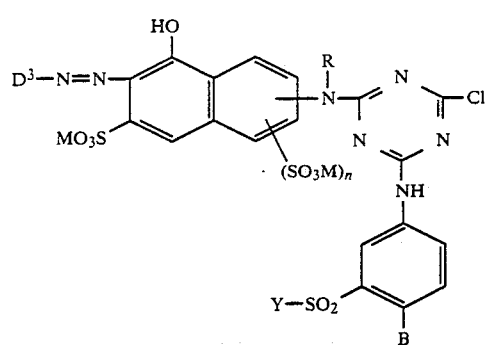
(1b)

in which

D¹ is a phenyl radical of the general formula (2a) where $R^1$, $R^2$, M and m have the abovementioned particularly preferred meanings, or is a naphth-2-yl radical which is substituted by 1, 2 or 3 sulfo groups, and D³ is a phenyl radical of the general formula (2b) where $R^1$, $R^2$ and Y have the abovementioned particularly preferred meaning or is a naphth-2-yl radical which is substituted by a group of the formula $Y-SO_2-$ where Y has the abovementioned particularly preferred meaning or by one such $Y-SO_2-$ group and one or two sulfo groups, and in which the remaining groups in the formulae have the abovementioned particularly preferred meanings.

The present invention furthermore relates to processes for the preparation of the compounds of the general formula (1) according to the invention. One of these processes can be carried out, for example, by reacting an azo compound of the general formula (4)

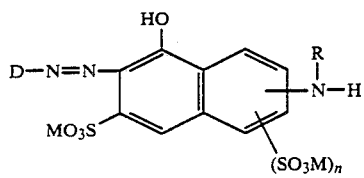
(4)

in which D, M, R and n have the abovementioned meanings, and an aromatic amine of the general formula (5)

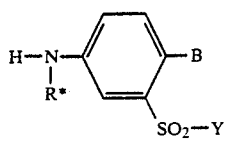
(5)

in which B, R* and Y have the abovementioned meanings, with 2,4,6-trichloro-s-triazine (cyanuric chloride) or 2,4,6-trifluoro-s-triazine (cyanuric fluoride) in any desired sequence or, if desired, simultaneously. Since the reactions with the three possible starting compounds mentioned above can be carried out in various sequences and, if desired, in some cases also simultaneously, variants of this process according to the invention are possible. The individual reactions of the amino compounds of the general formulae (4) and (5) with cyanuric chloride or cyanuric fluoride are preferably carried out successively.

Important process variants according to the invention for the preparation of the azo compounds of general formula (1) according to the invention comprise, for example, reacting a dihalotriazinylaminonaphtholazo compound of the general formula (6)

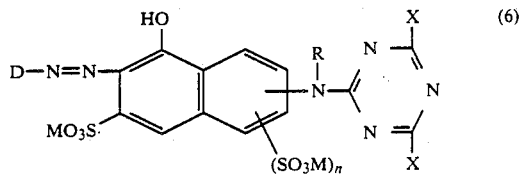
(6)

in which D, M, n, R and X have the abovementioned meanings and where both X have meanings which are identical to one another, with an aromatic amino compound of the abovementioned and defined general formula (5), or comprises reacting a dihalotriazinylamino compound of the general formula (7)

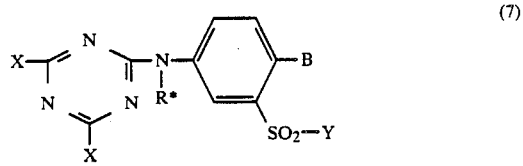
(7)

in which B, R*, Y and X have the abovementioned meanings, both X having identical meanings, with an azo compound of the abovementioned and defined general formula (4).

Another process according to the invention can be carried out, for example by coupling a monohalotriazinylaminonaphtholsulfonic acid compound of the general formula (8)

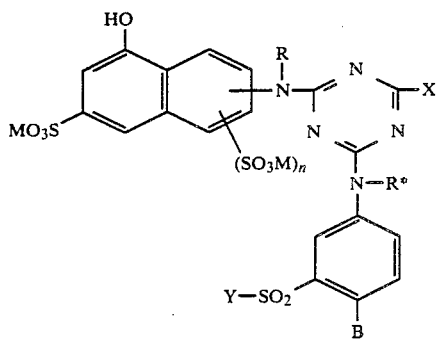

which B, M, n, R, R*, X and Y have the abovementioned meanings, with a diazonium compound of an aromatic amine of the general formula (9)

$$D-NH_2 \qquad (9)$$

in which D has one of the abovementioned meanings.

The starting compounds of the general formula (6) can be prepared by coupling a dihalotriazinylaminonaphtholsulfonic acid compound of the general formula (10)

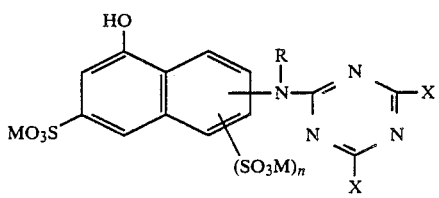

in which both X have the abovementioned meanings and are identical to one another, and M, R and n have the abovementioned meanings, with a diazonium compound of an aromatic amine of the general formula (9), or by reacting an amino-azo compound of the general formula (4) with cyanuric chloride or cyanuric fluoride. Such procedures are known per se—as are the starting compounds mentioned.

The starting compounds corresponding to the general formula (7) can also be prepared, analogously to procedures which are known per se, by reacting cyanuric chloride or cyanuric fluoride with a compound of the formula (5). The starting compounds of the general formula (4) can also be obtained analogously to known procedures by coupling the diazonium compound of an aromatic amine of the general formula (9) with the aminonaphtholsulfonic acid which can be derived from the general formula (4).

The reaction of cyanuric chloride or cyanuric fluoride with a compound of the general formula (5) and the reaction of a dihalotriazinylaminonaphtholsulfonic acid compound of the general formula (10) with a compound of the formula (5) and the reaction of a dihalotriazinylaminonaphtholsulfonic acid azo compound of the general formula (6) with a compound of the formula (5) can take place in an organic or aqueous-organic medium.

They preferably take place in an aqueous medium with addition of acid-binding agents, such as alkali metal carbonates, alkaline-earth metal carbonates, alkali metal bicarbonates or hydroxides or alkaline-earth metal bicarbonates or hydroxides, or alkali metal acetates, or a basic alkali metal phosphate, the alkali metals and alkaline-earth metals preferably being those of sodium, potassium and calcium. In addition, the addition of small amounts of a commercially available wetting agent may be expedient. If an organic, water-miscible inert solvent is added to the aqueous medium, this is preferably acetone or N-methylpyrrolidone. These condensation reactions are carried out at a temperature between 0° and 90° C., preferably between 0° and 60° C., and at a pH between 1.5 and 7, in particular between 2 and 5.

In the same manner, the reaction of the dihalotriazinylamino compound corresponding to the general formula (7) can take place with an aminonaphtholsulfonic acid azo compound of the general formula (4) or with aminonaphtholsulfonic acid as the naphtholic coupling component.

The coupling reaction, according to the invention, of the diazonium compound of an amine of the formula (9) with a compound of the general formula (8) or (10) can likewise take place in an aqueous-organic medium, and is preferably carried out in an aqueous medium in the slightly acid to neutral, if desired very slightly alkaline pH region, at a temperature between 0° and 50° C.

The coupling reactions are preferably carried out at a pH between 3 and 7 and at a temperature between 5° and 20° C. The coupling which is possible per se in the alkaline region should be avoided in order to prevent damage to the fiber-reactive groups, in particular those of the general formula -SO$_2$-Y.

A further process according to the invention is used to prepare azo compounds of the general formula (1) according to the invention in which Y represents the β-sulfatoethyl group; this comprises esterifying an azo compound which corresponds to the general formula (1), but in which one or both of the Y radicals in the formula and/or a Y' radical represent a β-hydroxyethyl group, in a procedure which is known per se using a sulfating agent.

Sulfating agents are, for example, 96 to 100% strength sulfuric acid, sulfuric acid containing sulfur trioxide, or chlorosulfonic acid. Preferably, 98 to 100% strength sulfuric acid or 10% strength oleum are employed, the reaction temperature being held between 0° and 20° C. In this esterification, other hydroxy-substituted alkyl groups in the B, R$^1$, R$^2$, R and R* groups in the formulae can also be esterified into the sulfato groups.

The starting amino compounds of the general formula (5) can be prepared, analogously to known procedures, from the corresponding amino compounds of the general formula (5a)

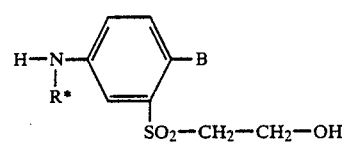

in which R* is a hydrogen atom and B has the abovementioned meaning, thus, for example, by reaction with conventional sulfating or phosphating agents for esterification into the corresponding β-sulfatoethylsulfonyl or β-phosphatoethylsulfonyl derivatives. The alkyl radical R* can be introduced in a conventional fashion by appropriate alkylation. The β-sulfatoethylsulfonyl compound corresponding to the general formula (5) can then be converted, in a procedure which is known per se, into its vinylsulfonyl compound, and the latter can be converted into its β-thiosulfatoethylsulfonyl compound. Compounds corresponding to the general formulae (5) and (5a) are known, for example, from European Patent Application Publications Nos. 0,153,599A, 0,171,611A and 0,197,418A, or can be prepared analogously to the methods given therein.

Amino compounds of the general formula (9) which are used, in a manner according to the invention, for the synthesis of the compounds (1) according to the invention and which contain a group of the above defined formula -SO$_2$-Y are, for example: 1-amino-4-(β-sulfatoethylsulfonyl)benzene, 1-amino-3-(β-sulfatoethylsulfonyl)benzene, 1-amino-2-(β-sulfatoethylsulfonyl)benzene, 1-amino-2-methoxy-5-(β-sulfatoethylsulfonyl)benzene, 1-amino-2-methoxy-4-(β-sulfatoethylsulfonyl)benzene, 1-amino-4-methoxy-3-(β-sulfatoethylsulfonyl)benzene, 1-amino-2-hydroxy-5-(β-sulfatoethylsulfonyl)benzene, 1-amino-2-hydroxy-4-(β-sulfatoethylsulfonyl)benzene, 1-amino-2-methyl-4-(β-sulfatoethylsulfonyl)benzene, 1-amino-2-methyl-5-(β-sulfatoethylsulfonyl)benzene, 1-amino-4-methyl-3-(β-sulfatoethylsulfonyl)benzene, 1-amino-2-chloro-4-(β-sulfatoethylsulfonyl)benzene, 1-amino-2-chloro-5-(β-sulfatoethylsulfonyl)benzene, 1-amino-4-chloro-5-(β-sulfatoethylsulfonyl)benzene, 1-amino-2-bromo-4-(β-sulfatoethylsulfonyl)benzene, 1-amino-2-carboxy-5-(β-sulfatoethylsulfonyl)benzene, 1-amino-2-carboxy-4-(β-sulfatoethylsulfonyl)benzene, 1-amino-2-sulfo-4-(β-sulfatoethylsulfonyl)benzene, 1-amino-2-sulfo-5-(β-sulfatoethylsulfonyl)benzene, 1-amino-2,5-dimethoxy-4-(β-sulfatoethylsulfonyl)benzene, 1-amino-2,4-dimethoxy-5-(β-sulfatoethylsulfonyl)benzene, 1-amino-2,5-diethoxy-4-(β-sulfatoethylsulfonyl)benzene, 1-amino-2-methoxy-5-methyl-4-(β-sulfatoethylsulfonyl)benzene, 1-amino-2-methyl-5-methoxy-4-(β-sulfatoethylsulfonyl)benzene, 1-amino-2,5-dimethyl-4-(β-sulfatoethylsulfonyl)benzene, 1-amino-2,4-disulfo-5-(β-sulfatoethylsulfonyl)benzene, 2-amino-1-sulfo-6-(β-sulfatoethylsulfonyl)naphthalene, 2-amino-6-sulfo-8-(β-sulfatoethylsulfonyl)naphthalene, 1-amino-6-sulfo-4-(β-sulfatoethylsulfonyl)naphthalene, 1-amino-7-sulfo-5-(β-sulfatoethylsulfonyl)naphthalene, 1-amino-4-sulfo-6-(β-sulfatoethylsulfonyl)naphthalene, 1-amino-4-sulfo-7-(β-sulfatoethylsulfonyl)naphthalene, 2-amino-1-sulfo-5-(β-sulfatoethylsulfonyl)naphthalene, 2-amino-1,7-disulfo-5-(β-sulfatoethylsulfonyl)naphthalene, 2-amino-8-sulfo-6-(β-sulfatoethylsulfonyl)naphthalene, 1-amino-4-(β-sulfatoethylsulfonyl)naphthalene, 1-amino-5-(β-sulfatoethylsulfonyl)naphthalene, 1-amino-6-(β-sulfatoethylsulfonyl)naphthalene, 1-amino-7-(β-sulfatoethylsulfonyl)naphthalene, 1-amino-2-ethoxy-6-(β-sulfatoethylsulfonyl)naphthalene, 2-amino-5-(β-sulfatoethylsulfonyl)naphthalene, 2-amino-6-(β-sulfatoethylsulfonyl)naphthalene, 2-amino-7-(β-sulfatoethylsulfonyl)naphthalene and 2-amino-8-(β-sulfatoethylsulfonyl)naphthalene, and the corresponding β-thiosulfatoethylsulfonyl, β-phosphatoethylsulfonyl, β-chloroethylsulfonyl and vinylsulfonyl derivatives thereof.

Aromatic amino compounds of the general formula (9) which are used according to the invention for the preparation of the compounds (1) according to the invention and which contain no fiber-reactive group corresponding to the general formula -SO$_2$-Y are, for example: 1-aminobenzene-2-sulfonic acid, 1-aminobenzene-3- and -4-sulfonic acid, 2-amino-4-sulfobenzoic acid, 2-amino-5-sulfobenzoic acid, 4-amino-2-sulfobenzoic acid, 4-aminotoluene-2- and -3-sulfonic acid, 2-aminotoluene-4- and -5-sulfonic acid, 2-aminotoluene-4-carboxylic acid, anthranilic acid, aniline, 2-, 3- and 4-methylaniline, 2-, 3- and 4-anisidine, 2-, 3- and 4-chloroaniline, 4-aminobenzoic acid, 2-aminoanisole-4- and -5-sulfonic acid, 4-aminoanisole-2- and -3-sulfonic acid, 3-chloro-2-aminotoluene-5-sulfonic acid, 4-chloro-2-aminotoluene-5-sulfonic acid, 5-chloro-2-aminotoluene-3- and -4-sulfonic acid, 6-chloro-2-aminotoluene-4-sulfonic acid, 6-chloro-3-aminotoluene-4-sulfonic acid, 1-aminobenzene-2,5-disulfonic acid, 1-aminobenzene-2,4- and -3,5-disulfonic acid, 2-aminotoluene-3,5-disulfonic acid, 4-amino-1,3-dimethyl-5-sulfonic acid, 2-aminotoluene-4,5- and -4,6-disulfonic acid, 4-aminotoluene-2,5-disulfonic acid, 2-aminonaphthalene-1-sulfonic acid, 2-aminonaphthalene-5and -6-sulfonic acid, 2-aminonaphthalene-7- and -8-sulfonic acid, 1-aminonaphthalene-2-, -3-, -4-, -5-, -6-, -7- and -8-sulfonic acid, 2-aminonaphthalene-4,8-disulfonic acid, 2-aminonaphthalene-6,8-disulfonic acid, 2-aminonaphthalene-1,5-, -1,6- and -1,7-disulfonic acid, 2-aminonaphthalene-5,7-, -3,6-, -3,7- and -4,7-disulfonic acid, 1-aminonaphthalene-2,4-, -2,5-, -3,6-, -3,7-, -3,8-, -4,6-, -4,7-, -4,8-, -5,7- and -6,8-disulfonic acid, 2-aminonaphthalene-3,6,8-trisulfonic acid, 2-aminonaphthalene-4,6,8- and -1,5,7-trisulfonic acid, 1-aminonaphthalene-2,4,7-trisulfonic acid and 1-aminonaphthalene-2,4,8-, -3,5,7-, -3,6,8- and -4,6,8-trisulfonic acid.

Aminonaphtholsulfonic acids which are used for the synthesis of the azo compounds (1) according to the invention and which, if appropriate after conversion into the triazinylamino derivatives thereof, are coupled, in the ortho-position to the hydroxy group, with the diazonium compound of the aromatic amine of the general formula (9) are, in particular, 1-amino-3,6-disulfo-8-naphthol, 1-amino-4,6-disulfo-8-naphthol, 2-amino-3,6-disulfo-8-naphthol, 3-amino-6-sulfo-8-naphthol, 3-amino-4,6-disulfo-8-naphthol, 3-methylamino-6-sulfo-8-naphthol, 4-amino-6-sulfo-8-naphthol, 2-amino-6-sulfo-8-naphthol, 1-amino-4-sulfo-8-naphthol and 2-methylamino-6-sulfo-8-naphthol.

Compounds corresponding to the general formula (5) which are used as starting compounds for the synthesis of the azo compounds according to the invention are, for example:
4-dimethylamino-3-(β-sulfatoethylsulfonyl)aniline,
4-ethylamino-3-(β-sulfatoethylsulfonyl)aniline,
4-(N-morpholino)-3-(β-sulfatoethylsulfonyl)aniline,
4-N-(β-sulfatoethyl)amino-3-(β-sulfatoethylsulfonyl)aniline,
4-[N-methyl-N-(β-sulfatoethyl)]amino-3-(β-sulfatoethylsulfonyl)aniline,
4-N-(β-sulfoethyl)amino-3-(β-sulfatoethylsulfonyl)aniline,
4-[N-methyl-N-(β-sulfatoethyl)]amino-3-(β-sulfatoethylsulfonyl)aniline,
4-N-(carboxymethyl)amino-3-(β-sulfatoethylsulfonyl)aniline,
4-N-[β-(4'-sulfophenyl)ethyl]amino-3-(β-sulfatoethylsulfonyl)aniline,
4-methylamino-3-(β-sulfatoethylsulfonyl)aniline,
4-N-(γ-sulfato-n-propyl)amino-3-(β-sulfatoethylsulfonyl)aniline,
4-N-[β-(β'-sulfato-ethoxy)ethyl]amino-3-(β-sulfatoethylsulfonyl)aniline,
4-[N-methyl-N-(γ-sulfato-n-propyl)]amino-3-(β-sulfatoethylsulfonyl)aniline,
4-[(β-sulfatoethyl)thio]-3-(β-sulfatoethylsulfonyl)aniline, 3-(β-sulfatoethylsulfonyl)-1,4-diaminobenzene,
4-N-(β-sulfatoethyl)amino-3-(β-thiosulfatoethylsulfonyl)aniline,
4-N-(β-phosphatoethyl)amino-3-(β-phosphatoethylsulfonyl)aniline,
4-N-(β-sulfato-n-propyl)amino-3-(β-sulfatoethylsulfonyl)aniline,
4-N-(β,γ-disulfato-n-propyl)amino-3-(β-sulfatoethylsulfonyl)aniline,
4-N-(β-carboxyethyl)amino-3-(β-sulfatoethylsulfonyl)aniline,
4-N-[β(β'-sulfatoethylamino)ethyl]amino-3-(β-sulfatoethylsulfonyl)aniline,
4-N-{β-[N'-methyl-N'-(β-sulfatoethyl)amino]ethyl}amino-3-(β-sulfatoethylsulfonyl)aniline,
4-N-[(β-sulfato-α-methyl)ethyl]amino-3-(β-sulfatoethylsulfonyl)aniline,
4-diethylamino-3-(β-sulfatoethylsulfonyl)aniline and
4-N-{β-[4'-(β'-sulfatoethylsulfonyl)phenyl]ethyl}amino-3-(β-sulfatoethylsulfonyl)aniline,
and derivatives thereof in which the sulfato group(s) and/or phosphato group are replaced by the hydroxy group.

Of these compounds,
4-[N-methyl-N-(β-sulfoethyl]amino-3-(β-sulfatoethylsulfonyl)aniline,
4-N-(β-sulfatoethyl)amino-3-(β-sulfatoethylsulfonyl)aniline,
4-[N-methyl-N(β-sulfatoethyl)]amino-3-(β-sulfatoethylsulfonyl)aniline,
4-N-(β-sulfoethyl)amino-3-(β-sulfatoethylsulfonyl)aniline and
4-diethylamino-3-(β-sulfatoethylsulfonyl)aniline, are preferred.

The compounds prepared according to the invention are removed from the synthesis batches by generally known methods, either by precipitation from the reaction medium by means of electrolytes, such as, for example, sodium chloride or potassium chloride, or by evaporation of the reaction solution, for example by spray drying, it being possible to add a buffer substance to this reaction solution. The novel compounds (1) according to the invention have fiber-reactive properties and have very good dye properties. They can therefore be used for dyeing material containing hydroxy and/or carboxamide groups, in particular fiber material, and also leather. In addition, the solutions produced in the synthesis of the compounds according to the invention can be fed, if appropriate after addition of a buffer substance and if appropriate after concentration, directly as a liquid preparation to the dyeing use.

The present invention also relates to the use of the compounds of the general formula (1) according to the invention for dyeing materials containing hydroxy and/or carboxamide groups, and to methods for application thereof to these substrates. Included here are mass dyeing, for example nylon films, and dyeing by printing. Preferred materials are those in the form of fiber materials, in particular in the form of textile fibers, such as yarns, packages and fabrics.

Materials which contain hydroxy groups are natural or synthetic materials containing hydroxy groups, such as, for example, cellulose fiber materials or their regenerate products, and polyvinyl alcohols. Cellulose fiber materials are preferably cotton, but also other vegetable fibers, such as linen, hemp, jute and ramie fibers; regenerated cellulose fibers are, for example, staple viscose and filament viscose.

Materials containing carboxamide groups are, for example synthetic and natural polyamides and polyurethanes, in particular in the form of the fibers, for example wool and other animal hairs, silk, leather, nylon-6,6, nylon-6, nylon-11 and nylon-4.

The compounds according to the invention can be applied and fixed to the substrates mentioned, in particular to the fiber materials mentioned, using the application techniques which are known for water-soluble dyes, in particular for fiber-reactive dyes. Thus, very good color yields and an excellent color build-up are obtained by applying them to cellulose fibers by the exhaust method from long liquor using a very wide variety of acid-binding agents and, if appropriate, neutral salts such as sodium chloride or sodium sulfate. Dyeing is carried out in an aqueous bath at temperatures between 40° and 105° C., where appropriate at temperatures up to 130° C. under pressure, and where appropriate in the presence of customary dyeing auxiliaries. A possible procedure is to introduce the material into the warm bath and gradually to warm the latter to the desired dyeing temperature and to complete the dyeing process at this temperature. The neutral salts which accelerate exhaustion of the dye can, if desired, also be added to the bath first when the actual dyeing temperature is reached.

Excellent color yields and very good color build-up are likewise obtained on cellulose fibers using the padding process, it being possible to carry out fixing in a customary manner by dwelling at room temperature or elevated temperature, for example up to about 60° C., by steaming or by means of dry heat.

Customary printing methods for cellulose fibers, which can either be carried out in one step, for example by printing with a print paste containing sodium bicarbonate or another acid-binding agent and the dye, and subsequently steaming at 100° to 103° C., or in two steps, for example by printing with a neutral or slightly acid print paste containing the dye and subsequently fixing either by passing the printed material through a hot electrolyte-containing alkaline bath or by overpadding with an alkaline electrolyte-containing padding liquor and subsequently dwelling this treated material or subsequently steaming or subsequently treating with dry heat, likewise produce strong prints having well-defined outlines and a clear white ground. The outcome of the prints depends only little on varying fixing conditions. Both in dyeing and printing, the degrees of fixation obtained using the compounds according to the invention are very high.

Fixing by means of dry heat in the customary thermofixing processes employs hot air at 120° to 200° C. Besides customary steam at 101° to 103° C., it is also possible to use superheated steam and high-pressure steam at temperatures up to 160° C.

The acid-binding agents which cause fixation of the dyes to the cellulose fibers are, for example, water-soluble basic salts of alkali metals and alkaline-earth metals of inorganic or organic acids, or compounds which liberate alkali when hot. In particular, alkali metal hydroxides and alkali metal salts of weak to moderately strong organic or inorganic acids may be mentioned, the sodium and potassium compounds preferably being meant of the alkali metal compounds. Such acid-binding agents are, for example, sodium hydroxide, potassium hydroxide, sodium carbonate, sodium bicarbonate, potassium carbonate, sodium formate, sodium dihydrogen phosphate and disodium hydrogen phosphate.

By treating the compounds according to the invention with the acid-binding agents, where appropriate under the action of heat, the compounds (dyes) according to the invention are bonded chemically to the cellulose fibers; after customary after treatment by rinsing in order to remove unfixed dye, the cellulose dyeings in particular exhibit excellent wet fastness properties, especially since unfixed dye can easily be washed out due to its good solubility in cold water.

The dyeings on polyurethane and nylon fibers are conventionally carried out from an acidic medium. Thus, for example, acetic acid and/or ammonium sulfate and/or acetic acid and ammonium acetate or sodium acetate can be added to the dye bath in order to obtain the desired pH. In order to achieve an acceptable levelness of the dyeing, it is advisable to add customary leveling auxiliaries, such as, for example, based on a product of the reaction of cyanuric chloride with three times the molar amount of an aminobenzenesulfonic acid and/or an aminonaphthalenesulfonic acid or based on a product of the reaction of, for example, stearylamine with ethylene oxide. As a rule, the material to be dyed is introduced into the bath at a temperature of about 40° C. and agitated therein for some time; the dye bath is then adjusted to the desired weakly acid, preferably weakly acetic acid, pH, and the actual dyeing is carried out at a temperature between 60° and 98° C. However, the dyeings can also be carried out at the boiling point or at temperatures up to 120° C. (under pressure).

The dyeings and prints produced on cellulose fiber materials using the azo compounds according to the invention have a high tinctorial strength, good light fastness properties and wet fastness properties, such as fastness to washing, pulling, water, seawater, overdyeing and perspiration, and also good pleating fastness, hot-press fastness and rub fastness. The good perspiration light fastness, chlorinated water fastness and wet light fastness of dyeings wetted with tap water should also be emphasized.

The examples below serve to illustrate the invention. The compounds described by means of their formulae are specified in the form of the free acids; in general, they are prepared and isolated in the form of their sodium or potassium salts and used for dyeing in the form of their salts. The starting compounds mentioned in the Examples below, in particular in the Tabulated Examples, in the form of the free acid can also be employed in the synthesis, as such or in the form of their salts preferably alkali metal salts, such as sodium or potassium salts.

The parts specified in the Examples are parts by weight, and the percentages are percentages by weight, unless otherwise stated. Parts by weight relate to parts by volume as the kilogram relates to the liter. The λ max values given in the Examples for the monoazo compound according to the invention represent the absorption maxima in the visible region, measured on the alkali metal salts of the monoazo compounds according to the invention in aqueous solution.

EXAMPLE 1

(a) 240 parts of 4-(N-methyl-N-β-hydroxyethyl-)amino-3-(β-hydroxyethylsulfonyl)aniline are introduced into 1,800 parts of 10% oleum at 5° to 10° C., and the mixture is stirred at about 10° C. for 12 to 14 hours. The reaction solution is then stirred into ice, and the mixture is neutralized to a pH of 6 by means of sodium bicarbonate with addition of ice. The solution is then evaporated under reduced pressure at 50° C.

(b) 224 parts of 2-sulfo-4-methoxyaniline are diazotized in a conventional fashion in 3,000 parts of ice water containing hydrochloric acid at a pH of 1.5 by means of 220 parts by volume of an aqueous 5N sodium nitrite solution. When the diazotization reaction is complete, excess nitrous acid is destroyed using amidosulfonic acid, and the diazonium salt solution is stirred into 1,100 parts of an aqueous, neutral solution of the sodium salt of 240 parts of 3-amino-6-sulfo-8-naphthol while maintaining the pH between 4 and 5. In order to complete the coupling reaction, the pH is adjusted to 6 to 6.5, and the reaction batch is warmed to 30° C. The monoazo compound formed is salted out using 10% of sodium chloride (relative to the weight of the reaction solution) and isolated.

(c) 45.3 parts of the monoazo compound prepared under b) are suspended in 200 parts of water and stirred into a suspension of 19.5 parts of cyanuric chloride in 100 parts of water and 200 parts of ice; the mixture is stirred at about 20° C. while maintaining a pH of 4.5 until the condensation reaction is complete, and 47.8 parts of the water-soluble 4-(N-methyl-N-β-sulfatoethylamino)-3-(β-sulfatoethylsulfonyl) aniline prepared under a) are then added, the pH is then adjusted to 4.5 using sodium bicarbonate, and the reaction batch is warmed to 50° C. while maintaining this pH and stirred for some time under these reaction conditions until the condensation reaction is complete. The azo compound according to the invention is isolated from the synthesis solution, after customary clarification thereof, either by spray-drying or by salting out using sodium chloride.

The monoazo compound of the formula

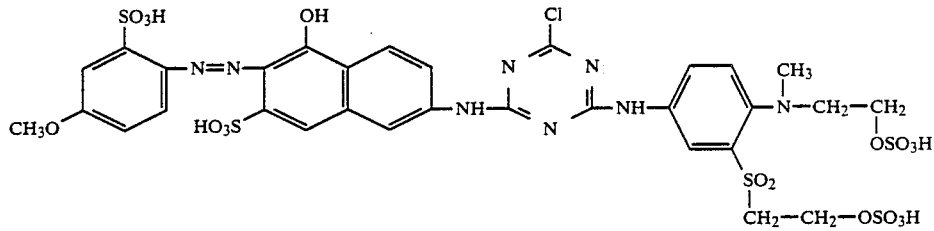

($\lambda_{max}$ = 501 nm)

(written in the form of the free acid) according to the invention is obtained as the sodium salt in the form of a red powder containing electrolyte salts (such as sodium chloride and sodium sulfate). The compound according to the invention is very readily water soluble and has very good dye properties. It dyes the materials mentioned in the description, but in particular cellulose fiber materials, by the application and fixing methods which are customary for fiber-reactive dyes in deep, bright yellowish red shades having a high degree of fixing. The dyeings and prints which can be obtained using this compound exhibit good wet fastness properties, such as, in particular, good wash fastness properties and good wet light fastness properties.

EXAMPLE 2

To prepare an azo compound according to the invention, a procedure as in Example 1 is followed, but 2-sulfo-4-methoxyaniline is replaced by the equivalent amount of 2-sulfo-4-ethoxyaniline.

The resultant monoazo compound according to the invention (having $\lambda_{max}=503$ nm) has very good fiber-reactive dye properties and very good water solubility. It is distinguished, in particular on cellulose fiber materials, by a high degree of fixing and produces on this material deep yellowish red dyeings and prints having good fastness properties, of which, in particular, the wet fastness properties, such as wash fastness properties and wet light fastness properties of dyeings wetted by tap water or a perspiration solution, may be emphasized.

EXAMPLE 3

To prepare an azo compound according to the invention, a procedure as in Example 1 is followed, but 2-sulfo-4-methoxyaniline is replaced by the equivalent amount of 4-sulfo-2-methoxyaniline.

The resultant monoazo compound according to the invention (having $\lambda_{max}=504$ nm) has very good fiber-reactive dye properties and very good water solubility. It is distinguished, in particular on cellulose fiber materials, by a high degree of fixing and produces on this material deep yellowish red dyeings and prints having good fastness properties, of which, in particular, the wet fastness properties, such as wash fastness properties and wet light fastness properties of dyeings wetted by tap water or a perspiration solution, may be emphasized.

EXAMPLE 3

To prepare an azo compound according to the invention, a procedure as in Example 1 is followed, but 2-sulfo-4-methoxyaniline is replaced by the equivalent amount of 4-sulfo-2-methoxyaniline.

The resultant monoazo compound according to the invention (having $\lambda_{max}=504$ nm) has very good fiber-reactive dye properties and produces, in particular on cellulose fiber materials, deep yellowish red dyeings and prints having good fastness properties, of which, in particular, the wet fastness properties, such as good wash fastness and good wet light fastness properties, may be emphasized.

EXAMPLE 4

61 parts of 1,5-disulfo-2-aminonaphthalene are diazotized in a conventional fashion (for example by the method of Example 1b), and the diazonium salt solution is stirred into 430 parts of an aqueous neutral solution of the sodium salt of 96 parts of 3-amino-6-sulfo-8-naphthol while maintaining a pH of about 5 5. Stirring is continued at about 20° C. and at a pH of 6.5 until the coupling reaction is complete, and the azo compound is isolated by salting out using 20% of sodium chloride (relative to the weight of the reaction solution).

(b) 19 4 parts of the azo compound prepared under a) are suspended in 200 parts of water, and the suspension is added to a suspension of 6.8 parts of cyanuric chloride in 100 parts of water and 200 parts of ice. Stirring is continued at about 20° C. and at a pH of 4.5 until the condensation reaction is complete, and 18.3 parts of the aniline compound prepared in Example 1a) are then added, the batch is adjusted to a pH of 4.5 using sodium carbonate and warmed to 50° C., and the condensation reaction is completed at 50° C. and at a pH of 4.5. The azo compound according to the invention is isolated from the synthesis solution, after customary clarification thereof, either by spray-drying or by salting out using sodium chloride.

The monoazo compound of the formula

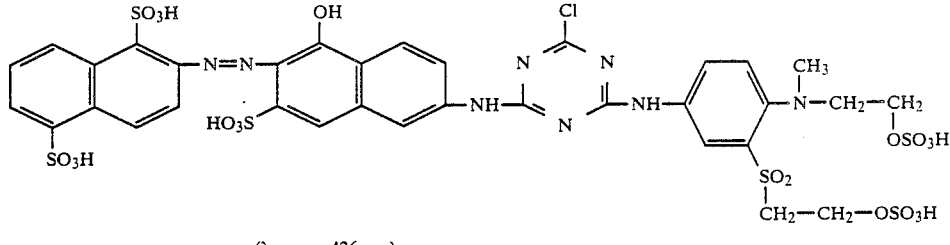

($\lambda_{max}$ = 426 nm)

(written in the form of the free acid) according to the invention is obtained as the sodium salt in the form of a red powder containing electrolyte salts (such as sodium chloride and sodium sulfate). The compound according to the invention has very good dye properties. It dyes the materials mentioned in the description, in particular cellulose fiber materials, by the application and fixing methods which are customary for fiber-reactive dyes in deep, bright orange-red shades having a high degree of fixing. The dyeings and prints which can be obtained using this compound exhibit very low phototropy and good wet fastness properties, such as good chlorinated water fastness.

EXAMPLE 5

(a) 3-Amino-6-sulfo-8-naphthol is reacted with cyanuric chloride to form the monocondensation product of these compounds by adding 120 parts of an aqueous, neutral solution of the sodium salt of 24 parts of 3-amino-6-sulfo-8-naphthol to a suspension of 20 parts of cyanuric chloride in 100 parts of water and 100 parts of ice, and carrying out the reaction to completion while maintaining a pH of 3 to 3.5 and a temperature of 5° to 10° C. while stirring for 8 hours.

(b) 28 parts of 4-(β-sulfatoethylsulfonyl)aniline are diazotized in a conventional fashion. The aqueous diazonium salt suspension in hydrochloric acid solution is then introduced at a pH between 3 and 4 into the reaction solution prepared under a). In order to complete the coupling reaction, the pH is subsequently increased to 5 to 6 and the mixture is stirred to about 20° C. for about 12 hours.

(c) 42 parts of 4-N-(β-sulfatoethyl) amino-3-(β-sulfatoethylsulfonyl)aniline are added to the synthesis solution obtained under b); the batch is stirred at about 20° C. for a further 2 hours at a pH of 5 to 6, then warmed to 40° to 45° C. and stirred at this temperature for a further 4 hours. The resultant azo compound according to the invention is isolated from the synthesis solution, after customary clarification thereof, by spray-drying or by salting out using sodium chloride.

The monoazo compound of the formula

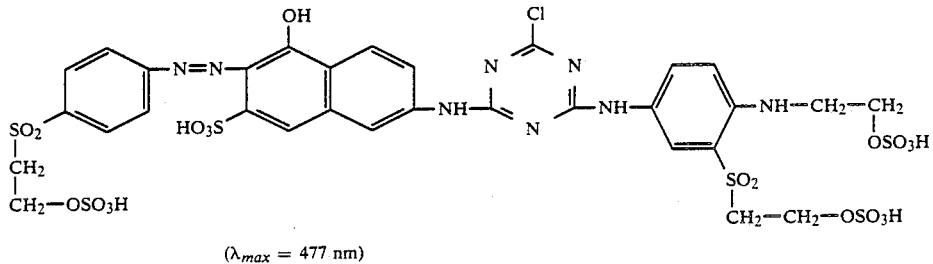

($\lambda_{max}$ = 477 nm)

(written in the form of the free acid) according to the invention is obtained as the sodium salt in the form of a red powder containing electrolyte salts (such as sodium chloride and sodium sulfate). The compound according to the invention has very good dye properties and dyes the materials mentioned in the description, but in particular cellulose fiber materials, by the application and fixing methods which are customary for fiber-reactive dyes in deep, bright reddish yellow shades. The dyeings and prints which can be obtained using the compound according to the invention exhibit good wet fastness properties.

EXAMPLE 6

In order to prepare an azo compound according to the invention, the procedure specified in Example 5 is followed, but 4-(β-sulfatoethylsulfonyl)aniline is replaced by the equivalent amount of 2-methoxy-5-(β-sulfatoethylsulfonyl)aniline as the diazo component.

The synthesized monoazo compound according to the invention (having $\lambda_{max}$=493 nm) has very good fiber-reactive dye properties and produces, in particular on cellulose fiber materials, deep dyeings and prints having a yellowish red shade and good fastness properties by the application and fixing methods which are customary in the art.

EXAMPLE 7

In order to prepare an azo compound according to the invention, the procedure specified in Example 5 is followed, but 4-(β-sulfatoethylsulfonyl)aniline is replaced by the equivalent amount of 4-methoxy-3-(β-sulfatoethylsulfonyl)aniline as the diazo component.

The synthesized monoazo compound according to the invention (having $\lambda_{max}$=493 nm) has very good fiber-reactive dye properties and produces, in particular on cellulose fiber materials, deep dyeings and prints having a yellowish red shade and good fastness properties by the application and fixing methods which are customary in the art.

EXAMPLES 8 to 60

In the following tabulated Examples, further compounds according to the invention are described by means of their components corresponding to a general formula (A)

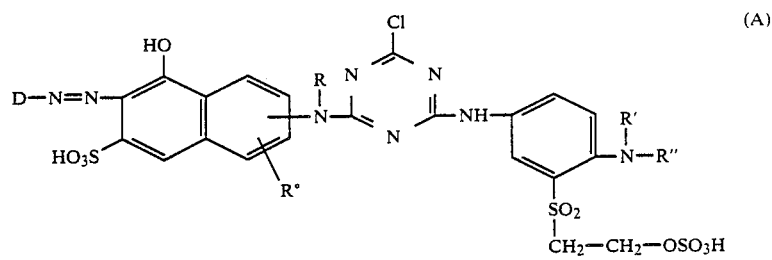

(A)

where R° is a hydrogen atom or a sulfo group. They can be prepared in the manner according to the invention, for example by the method of one of the working Examples above, using their components which are evident from the particular tabulated Example together with those from formula (A) (the diazo component D-NH₂, cyanuric chloride, the aminonaphtholsulfonic acid and the aniline compound corresponding to the general formula (5) which can be condensed with the triazine radical). They have fiber-reactive dye properties and produce, in particular on cellulose fiber materials by the application and fixing methods which are customary for fiber-reactive dyes, deep, fast dyeings and prints in the hues specified in the particular tabulated Example for dyeings on cotton.

| | | Compound of the formula (A) where | | | |
|---|---|---|---|---|---|
| Ex. | D is ... | Aminonaphthol-sulfonic acid | R' is ... | R" is ... | Hue |
| 8 | 2-Sulfo-4-methoxy-phenyl | 3-Amino-6-sulfo-8-naphthol | Hydrogen | β-Sulfatoethyl | yellowish red |
| 9 | 2-Sulfo-4-ethoxy-phenyl | " | Hydrogen | " | " |
| 10 | " | 3-Methylamino-6-sulfo-8-naphthol | Hydrogen | " | " |
| 11 | 2-Sulfo-4-methoxy-phenyl | " | Hydrogen | " | " |

-continued

| Ex. | D is... | Compound of the formula (A) where Aminonaphthol-sulfonic acid | R' is... | R" is... | Hue |
|---|---|---|---|---|---|
| 12 | 1,5-Disulfo-naphth-2-yl | 3-Amino-6-sulfo-8-naphthol | Hydrogen | " | orange |
| 13 | " | 3-Methylamino-6-sulfo-8-naphthol | Hydrogen | " | orange |
| 14 | " | " | Methyl | " | orange |
| 15 | " | 1-Amino-4,6-di-sulfo-8-naphthol | Ethyl | Ethyl | red |
| 16 | 2-Sulfo-phenyl | " | Ethyl | Ethyl | red |
| 17 | 2-Sulfo-4-methoxy-phenyl | 2-Amino-6-sulfo-8-naphthol | Methyl | β-Sulfatoethyl | yellowish red |
| 18 | " | 2-Methylamino-6-sulfo-8-naphthol | Methyl | " | " |
| 19 | " | " | Hydrogen | " | " |
| 20 | " | 2-Amino-6-sulfo-8-naphthol | Hydrogen | βSulfatoethyl | " |
| 21 | " | 3-Amino-6-sulfo-8-naphthol | Methyl | β-Sulfoethyl | " |
| 22 | " | " | Hydrogen | " | " |
| 23 | 1,5-Disulfo-naphth-2-yl | " | Hydrogen | " | orange |
| 24 | " | " | Methyl | " | orange |
| 25 | " | 3-Methylamino-6-sulfo-8-naphthol | Methyl | " | orange |
| 26 | 3,6,8-Trisulfo-naphth-2-yl | 3-Amino-6-sulfo-8-naphthol | Ethyl | Ethyl | yellowish red |
| 27 | 2-Sulfo-4,6-di-methyl-phenyl | " | Methyl | βSulfatoethyl | orange |
| 28 | " | " | Hydrogen | " | orange |
| 29 | 2-Sulfo-phenyl | 1-Amiono-3,6-di-sulfo-8-naphthol | Ethyl | Ethyl | bluish red |
| 30 | 2-Sulfo-4-methyl-phenyl | " | Methyl | βSulfatoethyl | " |
| 31 | 1-Sulfo-naphth-2-yl | " | Methyl | " | " |
| 32 | 1,5-Disulfo-naphth-2-yl | " | Ethyl | Ethyl | " |
| 33 | 2,5-Disulto-phenyl | " | Ethyl | Ethyl | bluish red |
| 34 | 2-Sulfo-4-methoxy-phenyl | 3-Methylamino-6-sulfo-8-naphthol | Methyl | β-Sulfoethyl | yellowish red |
| 35 | 2-Sulfo-4-ethoxy-phenyl | " | Methyl | " | " |
| 36 | 4-Sulfo-2-methoxy-phenyl | " | Methyl | " | " |
| 37 | 2-Methoxy-5-(β-sulfatoethylsulfonyl)-phenyl | 3-Amino-6-sulfo-8-naphthol | Methyl | β-Sulfatoethyl | " |
| 38 | 4-Methoxy-3-(β-sulfatoethylsulfonyl)-phenyl | " | Methyl | " | " |
| 39 | 4-(β-Sulfatoethylsulfonyl)-phenyl | " | Methyl | " | " |
| 40 | 2-Methoxy-5-methyl-4-(β-sulfatoethyl-sulfonyl)-phenyl | " | Methyl | " | " |
| 41 | 2,5-Dimethoxy-4-(β-sulfatoethylsulfonyl)-phenyl | " | Methyl | " | " |
| 42 | 2-Methoxy-5-(βsulfatoethylsulfonyl)-phenyl | 3-Methylamino-6-sulfo-8-naphthol | Methyl | β-Sulfatoethyl | yellowish red |
| 43 | 4-Methoxy-3-(β-sulfatoethylsulfonyl)-phenyl | " | Methyl | " | " |
| 44 | 2,5-Dimethoxy-4-(β-sulfatoethylsulfonyl)-phenyl | " | Methyl | " | " |
| 45 | 4-(β-Sulfatoethylsulfonyl)-phenyl | 1-Amino-4,6-di-sulfo-8-naphthol | Methyl | β-Sulfatoethyl | red |
| 46 | " | " | Ethyl | Ethyl | red |
| 47 | " | 1-Amino-3,6-di-sulfo-8-naphthol | Methyl | β-Sulfatoethyl | bluish red |
| 48 | " | " | Hydrogen | " | " |
| 49 | 3-(β-Sulfatoethylsulfonyl)-phenyl | " | Hydrogen | " | " |
| 50 | " | 2-Amino-6-sulfo-8-naphthol | Hydrogen | " | yellowish red |
| 51 | 4-(β-Sulfatoethylsulfonyl)-phenyl | " | Hydrogen | " | " |
| 52 | 6-Sulfo-8-(β-sulfatoethylsulfonyl)-naphth-2-yl | 2-Amino-6-sulfo-8-naphthol | Hydrogen | Ethyl | yellowish red |
| 53 | 2-Methoxy-4-(β-sulfatoethylsulfonyl)-phenyl | 3-Methyl-6-sulfo-8-naphthol | Methyl | β-Sulfatoethyl | " |
| 54 | 2,4-Dimethoxy-5-(β-sulfatoethylsulfonyl)-phenyl | " | Methyl | " | " |
| 55 | 2-Sulfo-4-ethoxy-phenyl | 3-Methylamino-6-sulfo-8-naphthol | Methyl | β-Sulfatoethyl | yellowish red (505) |
| 56 | 6,8-Disulfo-naphth-2-yl | 3-Amino-6-sulfo-8-naphthol | Methyl | " | yellowish red (497) |
| 57 | 4,6,8-Trisulfo-naphth-2-yl | " | Methyl | " | yellowish red (493) |
| 58 | 4,8-Disulfo-naphth-2-yl | " | Methyl | " | yellowish red (495) |
| 59 | 2-Sulfo-phenyl | 1-Amino-3,6-di-sulfo-8-naphthol | Methyl | Methyl | red (511) |
| 60 | 1,5-Disulfo-naphth-2-yl | " | Methyl | Methyl | red (540) |

EXAMPLE 61

In order to prepare a monoazo compound according to the invention, the procedure of Example 1 is followed, but 3-amino-6-sulfo-8-naphthol is replaced by the equivalent amount of 3-methylamino-6-sulfo-8-naphthol.

The alkali metal salt, according to the invention, of the compound of the formula

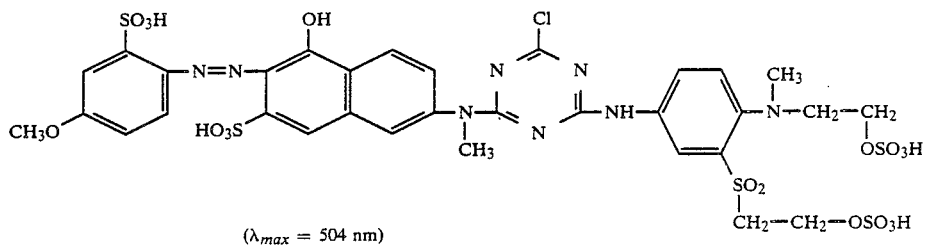

($\lambda_{max}$ = 504 nm)

has very good fiber-reactive dye properties and produces, in particularly on cellulose fiber materials, deep yellowish red dyeings and prints having good fastness properties, of which, in particular, the good wash, perspiration, chlorinated water and wet light fastness properties, of these in particular the good perspiration light fastness, may be emphasized.

EXAMPLE 62

In order to prepare a monoazo compound according to the invention, the procedure of Example 1 is followed, but 2-sulfo-4-methoxyaniline is replaced as the diazo component by the equivalent amount of 2-sulfoaniline.

The alkali metal salt, according to the invention, of the compound of the formula

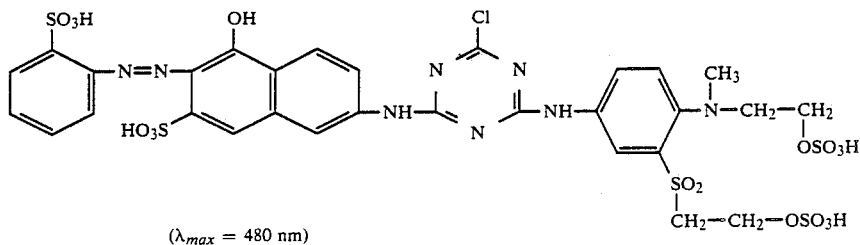

($\lambda_{max}$ = 480 nm)

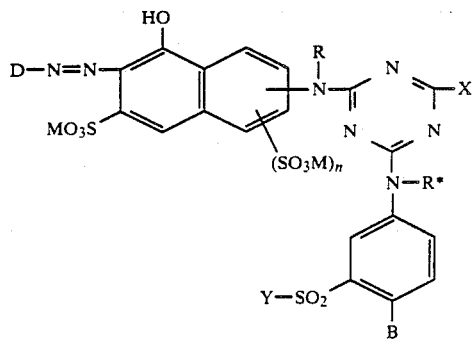

has very good water solubility and very good dye properties and produces, in particular on cellulose fiber materials by the application and fixing methods which are customary in the art for fiber-reactive dyes, deep reddish yellow dyeings having good fastness properties, of which, in particular, the good wet light fastness properties, such as perspiration light fastness, and the good chlorinated water fastness may be emphasized.

EXAMPLE 63

In order to prepare a monoazo compound according to the invention, the procedure of Example 4 is followed, but 1,5-disulfo-2-aminonaphthalene is replaced as the diazo component by the equivalent amount of 1,6-disulfo-2-aminonaphthalene. The resultant alkali metal compound according to the invention exhibits an absorption maximum at 491 nm in water and produces, in particular on cellulose fiber materials, as a consequence of its good dye properties, deep reddish orange dyeings and prints having good fastness properties, of which, in particular, the good chlorinated water fastness may be emphasized.

EXAMPLE 64

In order to prepare a monoazo compound according to the invention, the procedure of Example 4 is followed, but 1,5-disulfo-2-aminonaphthalene is replaced as diazo component by the equivalent amount of 3,6,8-trisulfo-2-aminonaphthalene. The resultant alkali metal compound according to the invention exhibits an absorption maximum at 496 nm in water and produces, in particular on cellulose fiber materials, as a consequence of its good dye properties, deep reddish orange dyeings and prints having good fastness properties, of which, in particular, the good chlorinated water fastness may be emphasized.

We claim:

1. A water-soluble monoazo compound conforming to the formula in which:

D is a group of the formula

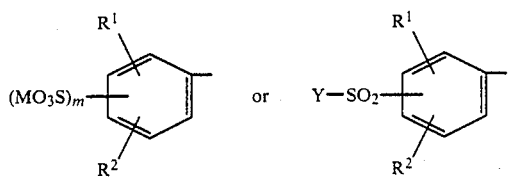

in which

M and Y have one the meanings mentioned below,

R$^1$ is hydrogen, alkyl having 1 to 4 carbon atoms, alkoxy having 1 to 4 carbon atoms or carboxy, R$^2$ is hydrogen, alkyl having 1 to 4 carbon atoms, alkoxy having 1 to 4 carbon atoms, sulfo or halogen, and m is zero or 1, or D is napth-2-yl substituted by 1, 2 or 3 sulfo groups, or is napth-2-yl substituted by a group Y—SO$_2$— where Y has one of the meanings mentioned below, or by such a group Y—SO$_2$— and 1 or 2 sulfo groups;

M is hydrogen or an alkali metal;

Y is β-thiosulfatoethyl, β-phosphatoethyl, β-chloroethyl, vinyl or β-sulfatoethyl;

n is zero or 1;

R is hydrogen, methyl or ethyl;

R* is hydrogen or alkyl having 1 to 4 carbon atoms, unsubstituted or substituted by 1 or 2 substituents selected from the group consisting of: alkoxy having 1 to 4 carbon atoms; sulfo; carboxy; hydroxy; alkanoyloxy having 2 to 5 carbon atoms; sulfato; phenyl unsubstituted or substituted by 1 or 2 substituents selected from alkyl having 1 to 4 carbon atoms, alkoxy having 1 to 4 carbon atoms, hydroxy, nitro, carboxy, acetylamino, sulfo and chlorine; and 1- or 2-naphthyl each being unsubstituted or substituted by 1, 2 or 3 sulfo groups;

X is fluorine or chlorine;

B is a group of the formula

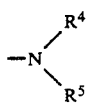

in which
- R⁴ is hydrogen or is alkyl having 1 to 4 carbon atoms unsubstituted or substituted by 1 to 2 substituents selected from sulfo, carboxy, sulfato, phosphato, alkoxy having 1 to 4 carbon atoms, hydroxy, alkanyloxy having 2 to 5 carbon atoms, phenyl and phenyl which is substituted by substituents selected from sulfo, carboxy, methyl, methoxy, ethoxy and chlorine, or is cyclopentyl or cyclohexyl each unsubstituted or substituted by 1 to 3 methyl groups, and
- R⁵ is hydrogen or is alkyl having 1 to 4 carbon atoms unsubstituted or substituted by 1 or 2 substituents selected from sulfo, carboxy, sulfato, phosphato, alkoxy having 1 to 4 carbon atoms, hydroxy, alkanoyloxy having 2 to 5 carbon atoms, phenyl and phenyl which is substituted by substituents selected from sulfo, carboxy, methyl, methoxy, ethoxy and chlorine, or is phenyl unsubstituted or substituted by 1 or 2 substituents selected from sulfo and carboxy, or
- R⁴ and R⁵, together with a nitrogen atom, are piperidino, piperazino or morpholino.

2. A compound according to claim 1, wherein D is a group of the formula

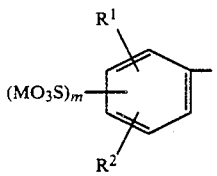

in which
- R¹ is hydrogen, alkyl having 1 to 4 carbon atoms, alkoxy having 1 to 4 carbon atoms or carboxy, and
- R² is hydrogen, alkyl having 1 to 4 carbon atoms, alkoxy having 1 to 4 carbon atoms, sulfo or halogen,
- or D is naphth-2-yl substituted by 1, 2 or 3 sulfo groups.

3. A compound according to claim 1, wherein D is a group of the formula

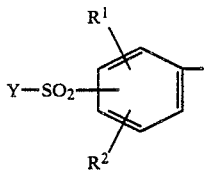

in which
- R¹ is hydrogen, alkyl having 1 to 4 carbon atoms, alkoxy having 1 to 4 carbon atoms or carboxy, and
- R² is hydrogen, alkyl having 1 to 4 carbon atoms, alkoxy having 1 to 4 carbon atoms, sulfo or halogen,
- or wherein D is naphth-2-yl substituted by a group of the formula Y—SO₂— where Y has the meaning mentioned in claim 1, or by such a Y—SO₂— group and 1 or 2 sulfo groups.

4. A compound according to claim 1, wherein D is a group of the formula

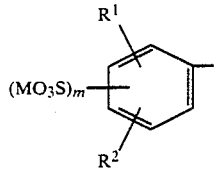

in which R¹ is hydrogen, methyl ethyl, methoxy or ethoxy, and R² is hydrogen, methoxy, ethoxy, sulfo or chlorine.

5. A compound according to claim 1, wherein D is a group of the formula

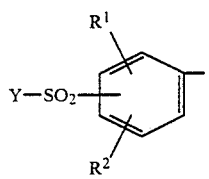

in which R¹ is hydrogen, methyl, ethyl, methoxy or ethoxy, and R² is hydrogen, methoxy, ethoxy or sulfo.

6. A compound according to claim 1, wherein R* is hydrogen.

7. A compound according to claim 1, wherein X is chlorine.

8. A compound according to claim 1, wherein R⁴ is hydrogen, methyl or ethyl, and R⁵ is hydrogen, alkyl having 1 to 4 carbon atoms, or alkyl having 2 to 4 carbon atoms substituted by one or two sulfato groups or one sulfo or one carboxy group, or is phenyl unsubstituted or substituted by 1 or 2 substituents selected from 2 sulfo, 1 alkyl having 1 to 4 carbon atoms, 1 alkoxy having 1 to 4 carbon atoms and 1 chlorine.

9. A compound as claimed in claim 1, wherein R⁴ is hydrogen, methyl or ethyl, and R⁵ is hydrogen, alkyl having 1 to 4 carbon atoms, or alkyl having 2 to 4 carbon atoms substituted by one or two sulfato groups or one sulfo or one carboxy group, or is phenyl unsubstituted or substituted by 1 or 2 substituents selected from 2 sulfo, 1 alkyl having 1 to 4 carbon atoms, 1 alkoxy having 1 to 4 carbon atoms and 1 chlorine.

10. A compound according to claim 1, or the formula

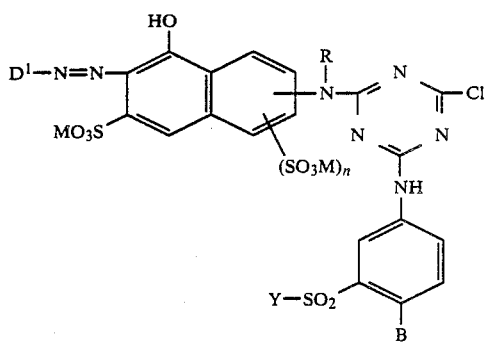

in which D¹ is a group of the formula

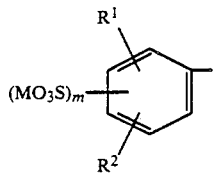
or is naphth-2-yl substituted by 1, 2 or 3 sulfo groups, R is hydrogen, methyl or ethyl.
11. A compound according to claim 1 or the formula
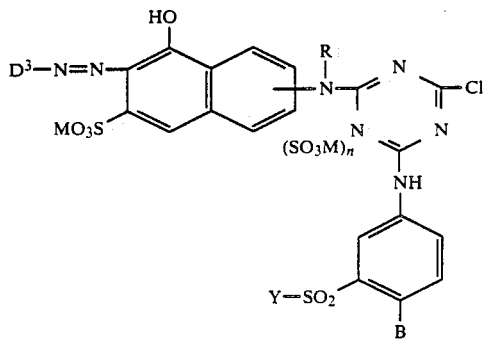
in which $D^3$ is a group of the formula
or is naphth-2-yl substituted by a group of the formula Y—SO$_2$—, or by such a Y—SO$_2$— group and one or two sulfo groups.
* * * * *